Patented Feb. 15, 1938

2,108,755

UNITED STATES PATENT OFFICE 2,108,755

PROCESS FOR PURIFICATION OF SULPHONATION PRODUCTS

Walter H. McAllister, Wyoming, Ohio, assignor, by direct and mesne assignments, of one-half to The Procter & Gamble Company, Cincinnati, Ohio, a corporation of Ohio, and of one-half to I. G. Farbenindustrie Aktiengesellschaft, Frankfort-on-the-Main, Germany No Drawing. Application February 21, 1935, Serial No. 7,583

16 Claims. (Cl. 260—99.12)

This invention relates to a process for the purification of sulphonation products by the removal of unsulphonated materials to make products of great detergent power.

The object of this invention is to prepare a detergent material by purification of salts of sulphonated primary and/or secondary aliphatic alcohols and/or olefines by means of the removal of the unsulphonated or otherwise undesirable organic materials by extraction of an aqueous-alcoholic solution of the neutralized sulphonated product with a suitable solvent.

It is to be understood that throughout this specification the term "sulphonation products" includes sulphonates in which the sulphur is bound directly to carbon and also sulphuric esters in which the sulphur is bound to oxygen which is bound to carbon. Likewise, "unsulphonated materials" signify materials which do not contain sulphuric esters or sulphonate groups.

It is well known that sulphonation products prepared in various ways from various types of organic materials exhibit good sudsing and detergent properties. For example, the alkali metal salts of the sulphonation products prepared from essentially pure high molecular alcohols obtained by catalytic hydrogenation of fatty acid esters under high pressure are recognized generally as good sudsing and detergent agents, and are relatively easy to prepare.

However, when the high molecular aliphatic alcohols, olefines or other organic materials to be sulphonated are in mixtures containing other organic materials which can be sulphonated only with difficulty or not at all, or when for any reason the material is imperfectly sulphonated, the sulphonation products of such mixtures may fail to exhibit the desired sudsing and detergent properties; also, during the treatment with sulphonating agents, a portion of the sulphonatable materials may be converted to harmful by-products which adversely affect cleansing properties. In any such case purification is difficult. If one attempts to remove the organic impurities by extracting the aqueous solution of the sulphonated product with petroleum ether, ethyl ether, or other organic solvent, very stable and troublesome emulsions or true solutions result, making it practically impossible to effect a separation.

I have now found that such separation can be effected without the formation of troublesome emulsions by dissolving the crude neutralized sulphonation products in an aqueous-alcoholic solution containing a suitable proportion of a low molecular alcohol, and extracting the organic impurities from such solution with a liquid fat solvent, which is substantially insoluble in the aqueous-alcoholic solution, such as petroleum ether, gasoline, naphtha, chlorinated hydrocarbons, etc. For this extraction any of the common hydrocarbon solvents are especially suitable. In general, especially if the solvent is to be recovered, it is preferable to use one which boils mostly between 40° C. and 100° C., although those of which the major portion distills below 200° C. are suitable.

Methyl, ethyl, propyl, and isopropyl alcohol are examples of the low molecular water-soluble alcohols suitable for use for prevention of emulsions. These alcohols, as will readily be noted, are the alcohols containing from one to three carbon atoms per molecule.

My process is applicable to most types of commercial sulphonated aliphatic products other than sulphonated fatty acids; it can be used with advantage to remove small amounts of unsulphonated materials from the sulphonated products prepared from high molecular alcohols, such as those obtained by catalytic hydrogenation of fatty oils. However, the process is of particular value in the purification of sulphonation products from other kinds of raw materials which do not readily show good detergent properties until the organic impurities are removed. Such raw materials are, for example, the mixtures of alcohols, hydrocarbons and various by-products from liquid phase partial oxidation of paraffin wax, or the mixture of aliphatic alcohols, olefines and saturated hydrocarbons obtainable by electrolysis of soap solution as described in my co-pending U. S. application Ser. No. 645,478. Preferably, the raw materials for sulphonation should contain but little free fatty acids, since they cannot be readily removed after sulphonation. These fatty acids as well as esters and other carbonyl compounds can be hydrogenated to alcohols, but most other types of difficultly sulphonatable organic materials which occur in such mixtures cannot be removed satisfactorily before the sulphonation. In addition, the sulphonation process may produce undesirable by-products which must be removed.

My process may be performed in the following manner. After sulphonation the neutralized sulphonated products are treated with approximately equal volumes of water and a monohydric aliphatic water-soluble alcohol and with a portion of a liquid hydrocarbon such as petroleum ether, whereupon most of the salts of the alkyl sulphuric acid esters and of the alkyl sulphonic acids dissolve in the aqueous alcoholic layer and most of the unsulphonated organic material dissolves in the petroleum ether layer. The petroleum ether layer is separated from the aqueous alcoholic layer and if desired the latter may be repeatedly treated with other portions of petroleum ether to remove more of the unsulphonated organic material. The low molecular weight alcohol is then removed, and recovered for re-use, if desired, by distillation. The following examples demonstrate how I use my process.

*Example 1.*—100 parts of a product of liquid phase oxidation of paraffin wax, having a hydroxyl value of 169 and consisting mainly of secondary alcohols was sulphonated by treatment with an equal weight of 22 per cent fuming sulphuric acid at 20° to 35° C. The acid sulphonation product was neutralized by pouring into 1000 parts of an aqueous-alcoholic sodium hydroxide solution containing equal volumes of denatured ethyl alcohol and of water. The aqueous-alcoholic solution was then extracted five times with petroleum ether boiling at 40° to 60° C., each time with a volume of petroleum ether equal to one fourth the volume of the aqueous-alcoholic solution, after which the ethyl alcohol and water were removed by evaporation to dryness. The purified product thus obtained possessed great cleansing and foaming power, while before the extraction with petroleum ether it was of little value in these respects.

*Example 2.*—A product prepared by liquid phase oxidation of paraffin wax and catalytic pressure hydrogenation to convert carbonyl compounds to alcohols had a hydroxyl value of 209. 100 parts of the product was sulphonated at 35° C. by treatment with the theoretical amount of chlorosulphonic acid to convert each hydroxyl group to a sulphuric ester group, using a vacuum to remove most of the hydrogen chloride liberated. The product was neutralized in 800 parts of an aqueous-alcoholic solution as in Example 1 and then extracted five times with petroleum ether boiling at 40° to 60° C., each time with a volume of petroleum ether equal to one fourth the volume of the aqueous-alcoholic solution. The material recovered from the petroleum ether weighed 37 per cent as much as the weight of the organic raw material used, and had a hydroxyl value of only 25. The ethyl alcohol was removed from the aqueous-alcoholic solution by steam distillation. The remaining aqueous solution of neutralized sulphonation product possessed much better sudsing and detergent power than a similar solution prepared without extraction of the impurities with petroleum ether.

*Example 3.*—500 parts of a product prepared by electrolytic decomposition of potassium coconut oil soap by the method of my co-pending U. S. Application No. 645,478, having a hydroxyl value of 92 and an iodine value of 58 was sulphonated by treatment with 375 parts of 96 per cent sulphuric acid. The product was neutralized with sodium hydroxide dissolved in 3500 parts of aqueous-alcoholic solution containing equal parts of water and denatured ethyl alcohol and extracted five times with petroleum ether boiling at 40° to 60° C., each time with a volume of petroleum ether equal to one fourth the volume of the aqueous-alcoholic solution. The organic impurities recovered from the petroleum ether solution weighed 43 per cent as much as the organic raw material used for the sulphonation. After removal of the ethyl alcohol and water from the solution by evaporation, the purified sulphonated product thus obtained had good detergent properties and was entirely suitable for use as a detergent for washing clothes, whereas the original impure mixture of sulphonated product and organic impurities had but little detergent value.

My process is not limited to the specific examples given above, but includes preparation of good detergents from sulphonation products which are poor detergents, or which may totally lack detergent properties, by removal of organic impurities in accordance with the principles herein disclosed. The process is not limited as to exact conditions of extraction of the organic impurities. The relative amounts of fat solvent, of low molecular alcohol and of water used may be varied within wide limits and the amounts are dependent largely on the character and amounts of the constituents in the mixtures to be purified. The material may be dissolved in water and the alcohol added afterward, or vice versa, if more convenient. While the preferred volume of low molecular alcohol is about 0.6 to 1.2 times the volume of water in the solution, a smaller amount of alcohol is of some benefit, and in some cases a volume of alcohol as low as 0.2 times that of the water is sufficient to prevent formation of emulsions and effect a separation in a reasonable length of time. A ratio of alcohol to water greater than two to one is seldom necessary or desirable. The essential point is to use sufficient alcohol to prevent the formation of emulsions and this amount will vary with the particular kind of material under treatment. The process of purification is applicable to many types of sulphonated products free from carboxyl groups but is of particular value for purification of water-soluble salts of sulphuric esters prepared from normal primary alcohols containing ten to twenty-two carbon atoms and branch chain or secondary aliphatic alcohols or olefines containing ten to twenty-five carbon atoms per molecule, said salts being substantially free from carboxyl groups and possessing good detergent properties after the organic impurities have been removed.

Having thus described my invention, what I claim as new and desire to secure by Letters Patent is:

1. The process for the purification of products reacted with sulphonating agents which comprises mixing with water a sulphonated product of the group consisting of a neutralized reaction product of a sulphonating agent on a primary aliphatic alcohol having ten to twenty-two carbon atoms per molecule, a neutralized reaction product of a sulphonating agent on a secondary aliphatic alcohol having ten to twenty-five carbon atoms per molecule, and a neutralized reaction product of a sulphonating agent on a product consisting predominantly of olefins having ten to twenty-five carbon atoms per molecule, incorporating the aqueous mixture thus formed and containing a salt of the sulphonated compound in solution with sufficient water-soluble monohydric aliphatic alcohol containing one to three carbon atoms to avoid the formation of troublesome emulsions in subsequent treatment, and subjecting the resulting mixture to extraction with liquid hydrocarbons having a boiling point below 200° C., thereby freeing the water-soluble salt from matter not reacted with and not capable of reacting with said sulphonating agents, and obtaining a laundering agent.

2. The process for the purification of products reacted with sulphonating agents, which comprises mixing with water a neutralized reaction product of a sulphonating agent on a primary aliphatic alcohol having ten to twenty-two carbon atoms per molecule, incorporating the aqueous mixture thus formed, and containing a salt of the sulphonated alcohol in solution, with sufficient water-soluble monohydric aliphatic alcohol containing one to three carbon atoms to avoid the formation of troublesome emulsions in subsequent treatment, and subjecting the resulting mixture to extraction with liquid hydrocarbons having a boiling point below 200° C., thereby freeing the water-soluble salt from matter not reacted with and not capable of reacting with said sulphonating agents and obtaining a laundering agent.

3. The process for the purification of products reacted with sulphonating agents, which comprises mixing with water a neutralized reaction product of a sulphonating agent on a secondary aliphatic alcohol having ten to twenty-five carbon atoms per molecule, incorporating the aqueous mixture thus formed, and containing a salt of the sulphonated alcohol in solution, with sufficient water-soluble monohydric aliphatic alcohol containing one to three carbon atoms to avoid the formation of troublesome emulsions in subsequent treatment, and subjecting the resulting mixture to extraction with liquid hydrocarbons having a boiling point below 200° C., thereby freeing the water-soluble salt from matter not reacted with and not capable of reacting with said sulphonating agents and obtaining a laundering agent.

4. The process for the purification of products reacted with sulphonating agents, which comprises mixing with water a neutralized reaction product of a sulphonating agent on a material consisting essentially of olefins having ten to twenty-five carbon atoms per molecule, incorporating the aqueous mixture thus formed, and containing salts of the sulphonated olefins in solution, with sufficient water-soluble monohydric aliphatic alcohol containing one to three carbon atoms to avoid the formation of troublesome emulsions in subsequent treatment, and subjecting the resulting mixture to extraction with liquid hydrocarbons having a boiling point below 200° C., thereby freeing the water-soluble salts from matter not reacted with and not capable of reacting with said sulphonating agents and obtaining laundering agents.

5. A process for the purification of products reacted with sulphonating agents, which comprises mixing with water the neutralized reaction product of a sulphonating agent on the unsaponifiable oxygen containing fraction of the liquid phase oxidation products of paraffin wax, incorporating with the aqueous mixture thus formed, and containing a salt of the sulphonated fraction in solution, sufficient water-soluble monohydric aliphatic alcohol containing one to three carbon atoms to avoid the formation of troublesome emulsions in subsequent treatment and subjecting the resulting mixture to extraction with liquid hydrocarbons having a boiling point below 200° C., thereby freeing the water-soluble salt from matter not reacted with and not capable of reacting with said sulphonating agents and obtaining a laundering agent.

6. The process for the purification of products reacted with sulphonating agents which comprises mixing with water the neutralized reaction product of a sulphonating agent on the product containing higher molecular aliphatic alcohols and olefins obtained by the electrolytic decomposition of a soap solution, incorporating the aqueous mixture thus formed, and containing a salt of the sulphonated product in solution, with sufficient water-soluble monohydric aliphatic alcohol having one to three carbon atoms to avoid the formation of troublesome emulsions in subsequent treatment, and subjecting the resulting mixture to extraction with liquid hydrocarbons having a boiling point below 200° C., thereby freeing the water-soluble salt from matter not reacted with and not capable of reacting with said sulphonating agents and obtaining a laundering agent.

7. The process for the production and purification of products reacted with sulphonating agents, which comprises subjecting paraffin wax to liquid phase oxidation to produce alcohols and carbonyl compounds, subjecting the product thus formed to pressure hydrogenation to convert the carbonyl compounds to alcohols, sulphonating the mixture of alcohols, neutralizing the sulphonating product to form water-soluble salts of the sulphonated alcohols, mixing the neutralized sulphonated product with water, incorporating the aqueous mixture thus formed with sufficient water-soluble monohydric aliphatic alcohol containing one to three carbon atoms to avoid the formation of troublesome emulsions in subsequent treatment, and subjecting the resulting mixture to extraction with liquid hydrocarbons having a boiling point below 200° C., thereby freeing the water-soluble salts from matter not reacted with and not capable of reacting with said sulphonating agents and obtaining a laundering agent.

8. The process of claim 1 in which the aqueous alcoholic solution employed for dissolving the water-soluble salts contains the low molecular weight water-soluble monohydric aliphatic alcohol in a proportion between about twenty per cent and about sixty-five per cent of the combined volumes of alcohol and water.

9. The process for the production and purification of products reacted with sulphonating agents, which comprises subjecting alcohols containing from ten to twenty-five carbon atoms to the action of a sulphonating agent, neutralizing the resulting products by means of a caustic alkali, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

10. The process for the production and purification of products reacted with sulphonating agents, which comprises subjecting alcohols containing from ten to twenty-five carbon atoms to the action of a sulphonating agent, after removal of any saponifiable constituents, neutralizing the resulting products by means of a caustic alkali, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

11. The process for the production and purification of products reacted with sulphonating agents, which comprises subjecting alcohols containing from ten to twenty-five carbon atoms to the action of chlorosulphonic acid, neutralizing the resulting products by means of a caustic alkali, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

12. The process for the production and purification of products reacted with sulphonating agents, which comprises subjecting alcohols containing from ten to twenty-five carbon atoms to the action of chlorosulphonic acid, neutralizing the resulting products by means of a concentrated aqueous solution of a caustic alkali, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents.

13. The process for the production and purification of products reacted with sulphonating agents, which comprises subjecting alcohols containing from ten to twenty-five carbon atoms to the action of chlorosulphonic acid, neutralizing the resulting products by means of a concentrated aqueous solution of caustic soda, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents, and evaporating the aqueous solution.

14. The process for the production and purification of products reacted with sulphonating agents, which comprises subjecting alcohols containing from ten to twenty-five carbon atoms, obtainable by the liquid phase oxidation of paraffin hydrocarbons, to the action of chlorosulphonic acid, after removal of any saponifiable constituents, neutralizing the resulting products by means of a concentrated aqueous solution of caustic soda, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons, having a boiling point below 200° C., thereby freeing the neutralized products reacted with the said sulphonating agent from matter not reacted with and not capable of reacting with sulphonating agents, and evaporating the aqueous solution.

15. The process for the production and purification of products reacted with sulphonating agents, which comprises subjecting alcohols containing from ten to twenty-five carbon atoms, obtainable by the liquid phase oxidation of paraffin hydrocarbons and subsequent hydrogenation of the oxidation products to the action of chlorosulphonic acid, after removal of any saponifiable constituents, neutralizing the resulting products by means of a concentrated aqueous solution of caustic soda, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents, and evaporating the aqueous solution.

16. The process for the production and purification of products reacted with sulphonating agents, which comprises subjecting alcohols containing from ten to twenty-five carbon atoms, obtainable by catalytic reduction of aliphatic carboxylic acids and esters thereof, to the action of chlorosulphonic acid, neutralizing the resulting products by means of a concentrated aqueous solution of caustic soda, mixing the neutralized products with water, incorporating the aqueous mixture with a water-soluble alcohol containing from one to three carbon atoms, and subjecting the resulting mixture to extraction with a water-insoluble solvent, selected from the group consisting of liquid hydrocarbons and chlorinated hydrocarbons having a boiling point below 200° C., thereby freeing the neutralized products reacted with the said sulphonating agent from matter not reacted with and not capable of reacting with sulphonating agents, and evaporating the aqueous solution.

WALTER H. McALLISTER.